Aug. 3, 1948.　　　　　W. G. SMITH　　　　　2,446,344
STORAGE ELEVATOR SYSTEM FOR AUTOMOBILES
Filed Dec. 12, 1945　　　　　　　　　　5 Sheets-Sheet 1
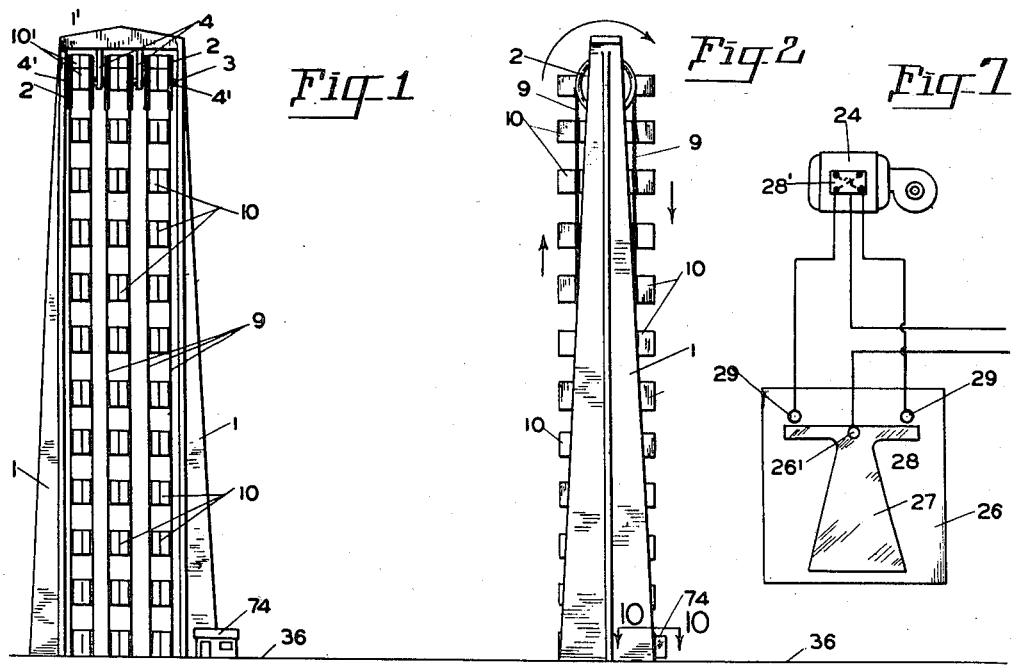
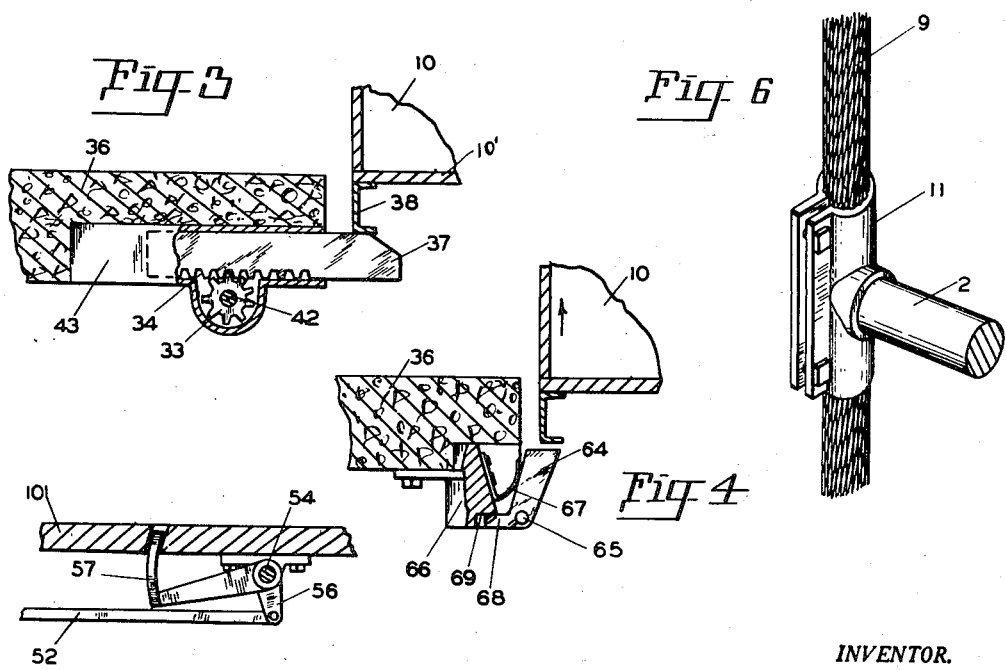
INVENTOR.
WILLIAM G. SMITH
BY G. F. McDougall
ATTORNEY Aug. 3, 1948.    W. G. SMITH    2,446,344
STORAGE ELEVATOR SYSTEM FOR AUTOMOBILES
Filed Dec. 12, 1945    5 Sheets-Sheet 2

INVENTOR.
WILLIAM G. SMITH
BY G. F. McDougall
ATTORNEY

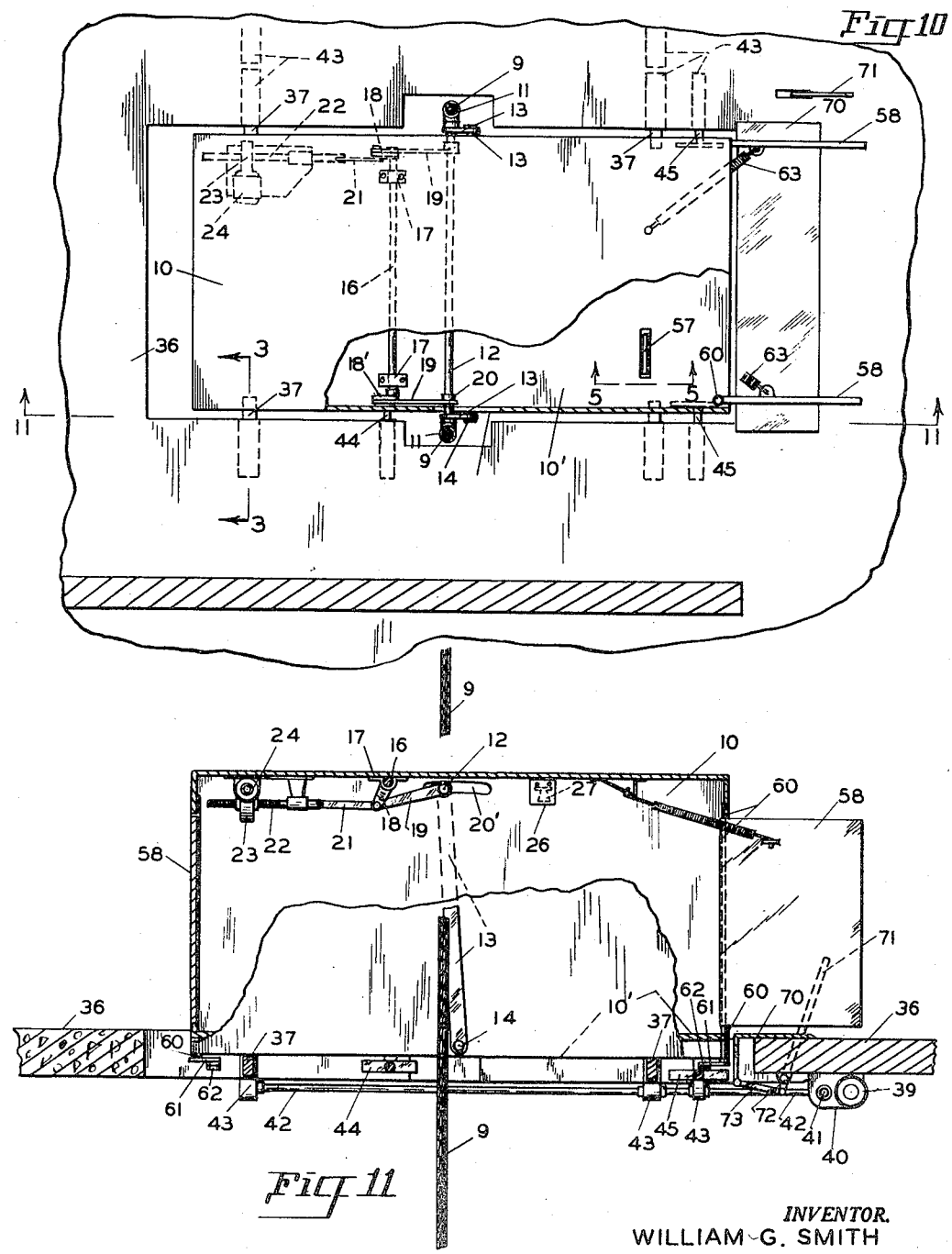

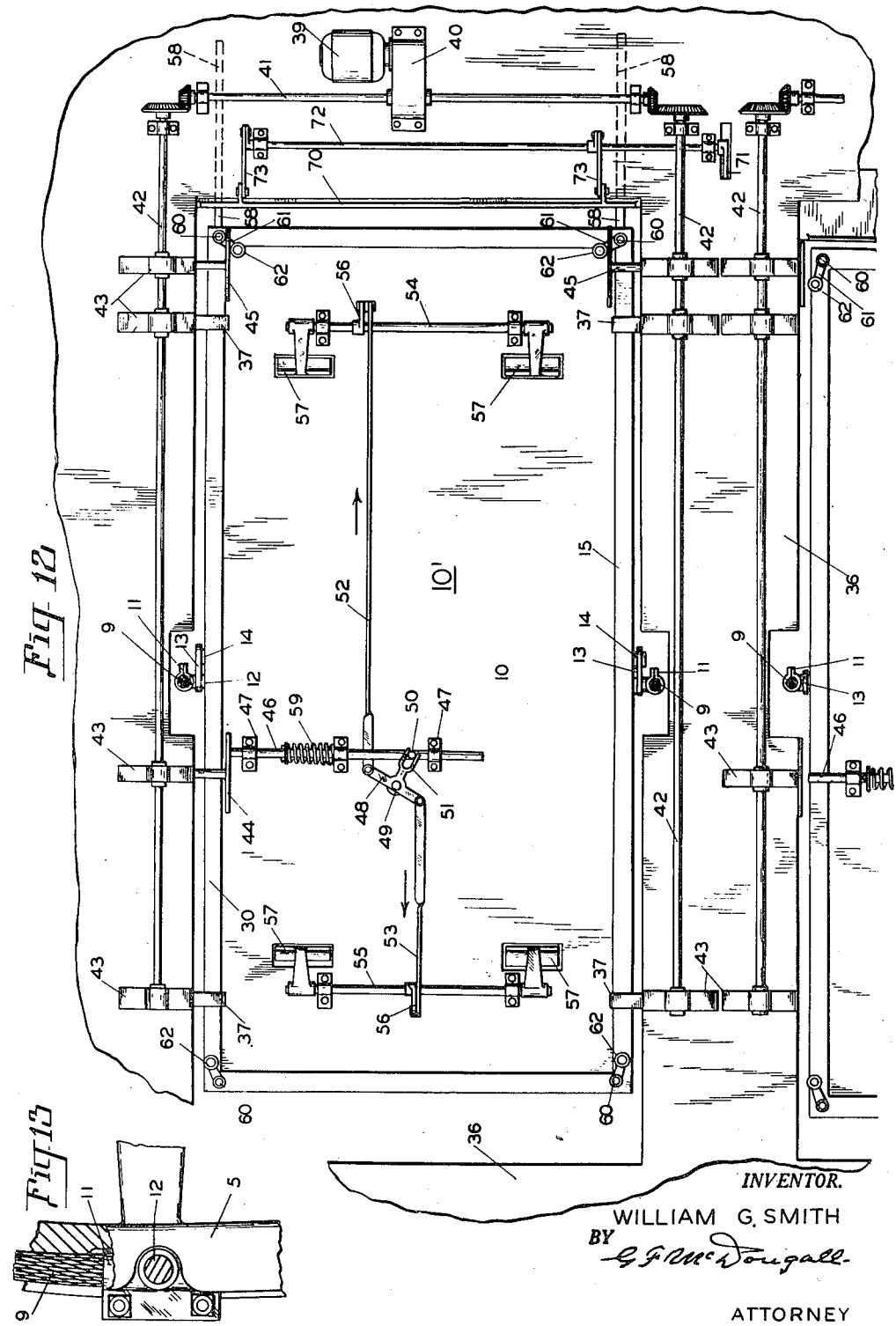

Patented Aug. 3, 1948

2,446,344

UNITED STATES PATENT OFFICE 2,446,344

STORAGE ELEVATOR SYSTEM FOR AUTOMOBILES

William G. Smith, Portland, Oreg.

Application December 12, 1945, Serial No. 634,522

4 Claims. (Cl. 214—16.1)

This invention relates to a storage elevator for automobiles, in which the elevator itself constitutes the storage space.

The objects of the invention are, to achieve adequate storage facilities for a large number of cars per unit of ground area required for the storage plant; to make sequestration of each individual car so complete that pilferage therefrom is practically impossible; to make it unnecessary to employ a large staff of skilled drivers, such as are required to operate the familiar ramp storage plants; to facilitate the quick reception of a car from a customer and its fast redelivery to him when he wants it; to make possible the isolation of cars in groups of say thirty or so, to the end that a short circuit in one that sets a fire need not endanger all of the cars in the storage plant; to make it possible to bring such a fire stricken car to delivery level in a very short time even if the fire aboard it would wholly prevent its being moved by a driver; and other objects of the economic variety that will be at once apparent.

The system is generally described as a structure comprising a pair of spaced structural members of tower like proportions, that support a spaced pair of large belt wheels, each pair mounted on a common axle at or near to their tops, with similar equipment near enough to the bottom of the towers so that a succession of elevator cages that will carry an automobile can pass successively around the wheels after the manner of an enlarged conveyor belt, except that the cages, unlike the elevator buckets, do not turn upside down to descend the reversely running belt reach on the down side of the belt. There are several kinds of suitable belts among which may be mentioned sprocket chain as well as the endless wire rope.

In order to satisfy the requirement that the cages that carry the cars shall not turn upside down on the reversely running down side of such a belt, it is necessary to suspend them pendulum-like to cross reach pivot bars, each end of which is attached to a belt member. "Pendulum-like" as herein used means always that the cages are pendulous and free to swing under the combined action of gravity with momentum. This makes an automatic balancing device absolutely necessary and it is an object of the invention to satisfy such need.

A pendulum-like cage, swingably mounted by its top structure, will be found to be almost impossible to balance in any other manner than by shifting the center of gravity of the platform upon which the automobile rests and it is an object to satisfy this problem adequately without piling weights off and on the cage when an automobile is disproportionately unbalanced by carried load.

When an automobile is to be driven onto a cage of the pendulum type, the platform that receives it must be stable and it is an object of the invention to provide concurrent operating devices that will hold the platform steady and open doors to permit its entry as a concurrent operation.

Drawings, showing the invention in such detail that an engineer will have no difficulty in building the system and making use of it, accompany and form a part of this specification, wherein three side by side tower supports are shown, indicating that any additional number may be added; and details of structures that will satisfy the objects, supra, are shown as follows:

Fig. 1 is a front elevation of one of my new and improved car elevator storage units;

Fig. 2 is an end view of Fig. 1;

Fig. 3 is a fragmentary detail taken on line 3—3 of Fig. 10, of one of the locking units used to support the carriages when they are on floor level for discharging or taking on vehicles;

Fig. 4 illustrates another preferred form of locking device used for supporting the carriages at floor level on their upward travel;

Fig. 5 is a fragmentary sectional view, taken on line 5—5 of Fig. 10, of one of the blocks used for holding the vehicle from rolling on the carriage;

Fig. 6 is a fragmentary detail of one of the clamps used to support the carriages on the cables;

Fig. 7 is a diagrammatical layout of a pendulum controlled electric switch for controlling the motor on the carriage for leveling the same;

Fig. 10 is a fragmentary plan sectional view taken on line 10—10 of Fig. 2;

Fig. 11 is a side sectional view taken on line 11—11 of Fig. 10;

Fig. 12 is an inverted plan view of Fig. 10 illustrating the mechanism for supporting the carriage while at floor level; and Fig. 13 is a detailed fragmentary view of one of the cable clamps mounted within one of the sheaves, illustrating how it is timed to the shaft.

Figure 8:
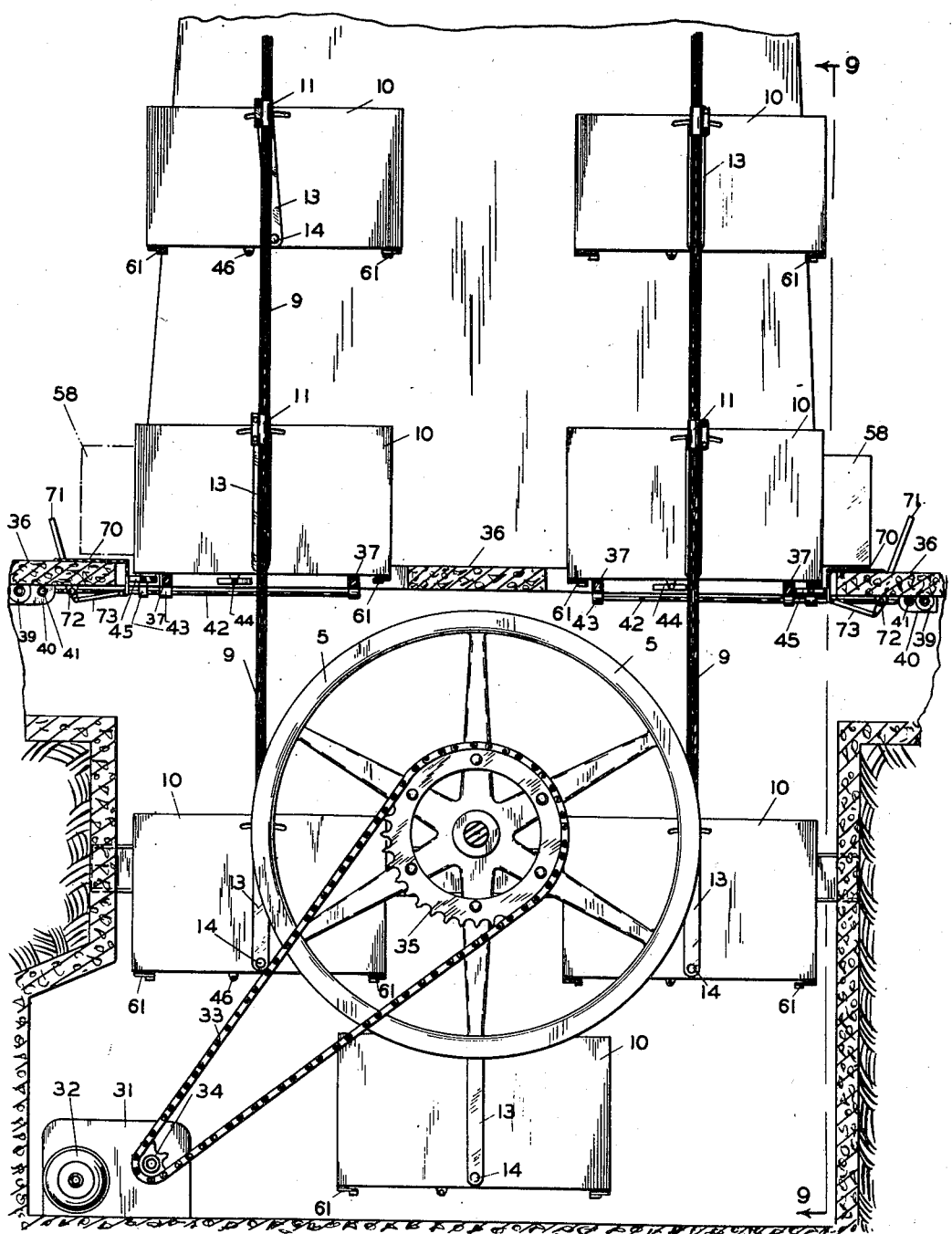
Fig. 8 is an enlarged end view taken on line 8—8 of Fig. 9, of the lower end of the elevator.
Figure 9:
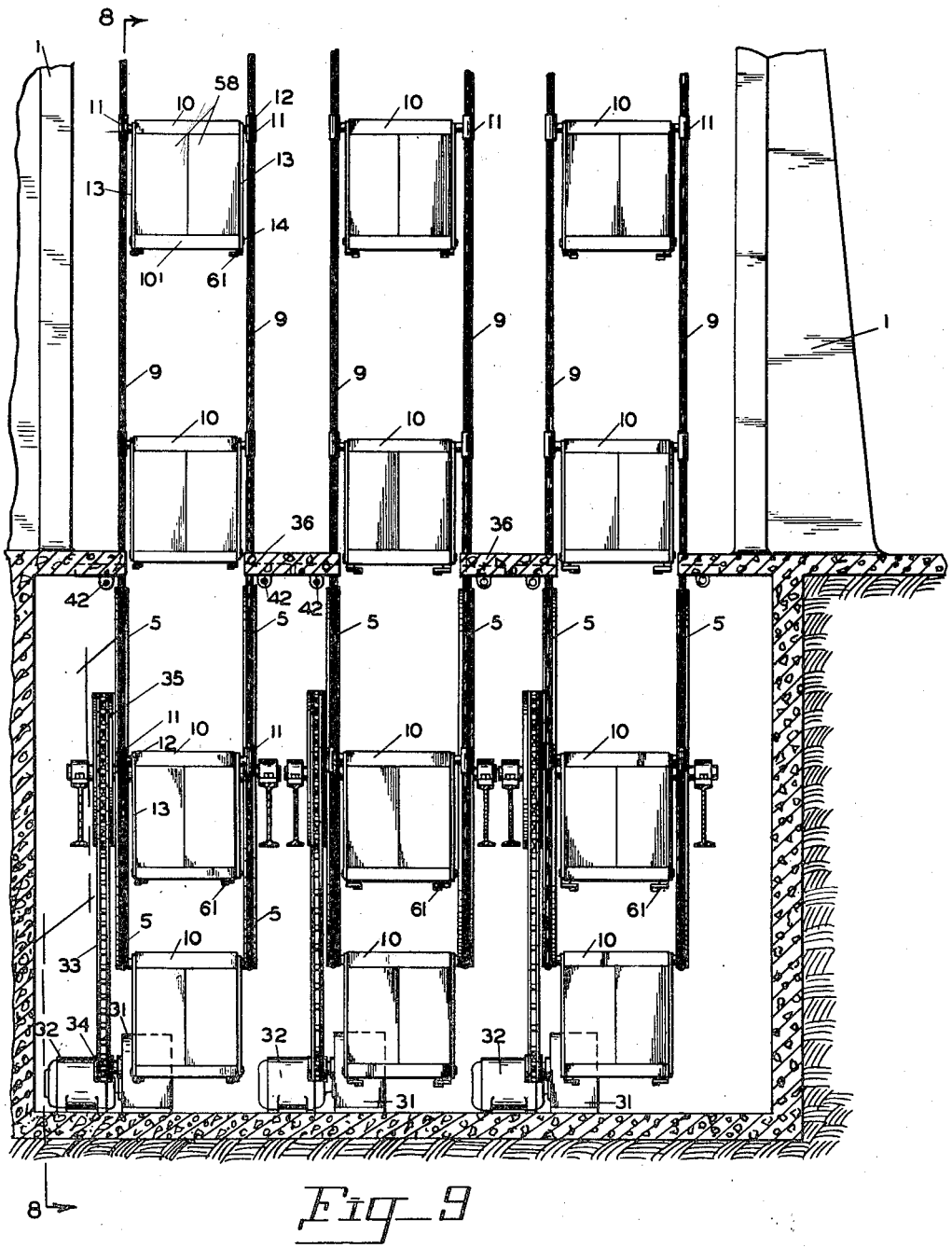
Fig. 9 is a sectional view taken on line 9—9 of Fig. 8.

Describing the drawings in detail: Numeral 1 represents a reinforced concrete tower. In Fig. 1, two towers are shown supporting three separate elevators by drop hangers 4 and end bearings 4' arranged to support the shaft 3, upon which are mounted belt sheaves 2 arranged to turn loosely on the shaft 3. A gallows frame 1' across the top of the towers 1, completes the upper structure, which is schematic only.

Each of the six sheaves mounted on the shaft 3, carries a cable 9 (in this exemplification), the cable 9 being in pairs and spaced therealong are ladder bars 12, suitably clamped to the cables as shown at 11 in Fig. 6. The ladder bars 12 will be of alloy steel with ample safety factor to carry the heaviest car that can be driven into one of the cages. The illustration is not intended as a design but as a diagram.

Each of the ladder bars carries a pair of eye-bars 13, which are provided with eyes at each end, which eye-bars 13 support the cages 10, which are the automobile receiving and storage units of the system. The eye-bars 13 are two in number, pivotally attached to the frame of the cages, one on each side, by pivots 14 near to the platform, the eye on the upper end of each containing the ladder bar that transmits the weight of the cage and its contents to the belts on both sides of the cage.

Calling attention to Fig. 11, which shows an approved suspension of a cage to a ladder bar, it will be observed that when a car is driven onto the platform 10' of the cage 1, any inequality of loading or inherently unequal weight distribution in the car itself will cause the cage to tip and it must be balanced before lifting so that the pendulum mounted cage will ride straight. Some stresses tending to throw the cage out of level can be expected to occur from time to time as the cages travel over from one reach of the belt to another, at the top or bottom of the belt travel. This can be remedied in part by anti-friction bearings, but additionally must be automatically compensated as it occurs.

The purpose of suspending the cages by eye-bars pivotally attached to the bottom of the cage is now seen. It is so that the top of the cage may swing and with it the carried automobile, to shift the center of gravity. This is accomplished by a pendulum operated switch 26, responsive to the pendulum 27 which is pivoted at 26' and carries a bar 28 which will operate a motor reversing gear 28' in either direction to compensate for tipping of the cage; and it will be noted that the pendulum itself does not tip, but the bar 28 remains stationary and the contacts 29 do the moving. The switch 26 will always be open and the motor inactive when the cage is in balance.

The motor 24 operates a worm wheel 23 that has a threaded nut in its center that engages the threaded rod 22 and slides the rod one way or the other as may be required by the leveling operation. The rod is coupled to the transmission 21, suspended by the link 18 from the top frame of the cage 10. The link 18 is rigidly mounted on the rockshaft 16, supported in bearings 17 and equally moves a link 18' at the other side of the cage 10. There are two links 19, provided with eyes 20 that contain the ladder bar 12 of the particular cage of which they form a part. The side of the cage near the top is shown with arcuate slots 20' to accommodate the travel of the cage in the leveling operation, and as explained, it is the cage top that moves, tipping the platform 10' and its carried load. As before stated, the motor can only operate when the platform is tipped out of level due to unequal loading.

Each pair of sheaves 5 at the lower ends of the towers 1, will be rigidly mounted on its individual shaft 5' in order to properly time both sides of the belt 9, upon which is also mounted a large sprocket 35 driven by a motor 32 through the self-contained reduction gear box 31, the pinion 34 and the chain belt 33. Since I do not claim to be the inventor of a special motor control for handling the elevators, any well known apparatus, of which a wide choice is available, may be used.

In illustrating the storage plant and considering Fig. 2, the ground floor level is regarded as being at 36, and to agree with the rest of the figures, the left hand reach of the belt and its carried cages 10, of which twelve are more or less in sight, will be assumed to travel upwards when they are loaded and go away to make room for a succeeding cage; and those on the right hand side of the towers 1 are reversely running and move downwardly, one cage on the right being numbered 10, with arrows to show its direction of motion.

Referring to Figs. 10, 11 and 12, I have illustrated a cage 10, at the discharge station for unloading the car having been housed therein. The motor 32 has been stopped by the elevator selective control system. When the cage reaches its stopping point the locking bolts 37 are caused to take the position shown in Figs. 3, 10, 11 and 12 directly under the frame 38 of the cage 10. These bars are caused to move to this position by the operation of the motor 39, reduction gear 40, drive shaft 41 and cross shaft 42, which have pinions 33 keyed thereto and cooperating with the teeth 34 of the locking bars 37. The bars 37 operate the guideways 43, which are imbedded in the ground surface or concrete 36, by any suitable means.

Simultaneously with the operation of the cross shafts 42 the plungers 44 and 45 are also caused to move to the position shown in Fig. 12. The plunger 44 contacts the rod 46, which is slidably mounted within the bearings 47. The movement of the rod 46 rocks the bell crank 48 about its pivot point 49 by the action of the pin 50 cooperating with the arm 51. This causes the connecting links 52 and 53 to move in the direction indicated, rotating the cross shafts 54 and 55 through the action of the cranks 56, which causes the stop blocks 57 to be lowered to the position as indicated in Fig. 5.

There are four of these blocks located in each cage and their purpose is to block the wheels of the vehicle being stored in the cage. These blocks are up in the dotted position while the cages are in motion, but as soon as the cage to be unloaded or loaded is stopped on the ground level and the doors 58 are opened and the locking bolts 37 are moved to locking position, these blocks are then lowered to the position shown in Fig. 5 by the mechanism above described. The spring 59 returns the blocks to their raised position by forcing the rod 46 in a direction so as to cause the connecting links 52 and 53 to raise the blocks after the plunger 44 has been moved away from the rod 46 when the locking bolts are withdrawn.

Describing the method of opening the doors 58: The doors are mounted upon vertical shafts 60, said shafts having crank arms 61 keyed thereto. When the plungers 45 are forced towards the crank arm 61, they contact the rollers 62, rotating the shafts 60 and opening the doors to the position shown in Figs. 10 and 11. Suitable springs 63 return the doors to closed position when the plungers 45 are withdrawn. When it is desired to withdraw the locking bolts 37, and plungers 44 and 45, the motor 39 is run in the reverse direction until these devices have been brought to cage starting position, releasing the cage so that it may move away from the ground floor level, which also affects the closing of the doors and the raising of the blocks in front of the wheels of the vehicle.

The control mechanism between the motor 39 for controlling the unlocking of the cage and the motor 32 for causing the cage to travel up and down on the cables 9 must be so timed and synchronized that one cannot be started until the other has properly completed its cycle. On the downward travel of the cage the mechanism relative to the blocks for the vehicle and for opening the doors can remain as just described, but the locking bolts themselves may be modified in the form of levers 64, which are pivotally mounted at 65 to the frames 66 which are secured to the floor level 36. A spring 67 holds the latch in the position shown in Fig. 4 which is held from further movement by the arm 68, bearing against the stop 69. As the cage travels up in the direction of the arrows, the latch 64 will be forced out of the way until the cage reaches the point as indicated, at which time the latch will take the position shown preventing backward movement of the cage.

Due to operation of the balancing mechanism in compensating for an unbalanced load condition, the cage is shifted more or less out of line with the cables 9, hence a movable plate 70 is used and can be moved to the edge of the carriage as best illustrated in Figs. 10 and 11 when the loading or unloading of the vehicle takes place. This floor plate is moved by the control lever 71 rotating the shaft 72, the crank 73 moving the plate 70 to the desired position. Operating current for the balancing motor is carried on all cages at all times, preferably by a trolley shoe but as not new, it is omitted.

Describing the storage or delivery of an automobile. The motor 32 of the selected elevator group rotates the lower sheave 5, revolving the cable 9 about the sheave 5 and the upper sheaves 2, bringing a chosen cage to the ground floor level. When the cage reaches the ground floor level, the operator stops the motor 32 and then throws the motor 39 into operation, bringing the locking bars 37 and plungers 44 and 45 into operation as described supra, blocking the cage against any movement while unloading or loading, opening the doors 58 and lowering the stop 57 so that the vehicle can be run out of the cage. After this is accomplished, the motor 39 is reversed, withdrawing the locking bolts 37 and plungers 44 and 45, allowing the blocks 57 to raise and the doors 58 to close.

While I have shown a particular form of mechanism for accomplishing the moving of the cages around their path of travel and locking them rigidly while unloading or loading the same and for bringing them to a balance, namely to a horizontal position when an unequal load is being carried thereby, and also for opening the doors and lowering blocks from beneath the wheels of the vehicles being housed; the drawings are not to be considered as working drawings or as limiting the invention to the structures shown and described. What I claim as new and desire to secure by Letters Patent is:

1. A pendulum type cage for a tower and conveyor type automobile storage device comprising an automobile platform, a superposed frame on said platform, a spaced pair of conveyor belts, a ladder bar spanning the distance between two belt members, characterized by the platform being suspended from the ladder bar by tension members pivotally connected to the platform and the ladder bar with means for displacing the top of the cage when needful to level the platform with its load.

2. In a leveling device for a pendulum type automobile cage, a platform for said cage, a superstructure superposed on said platform, and pendulum suspension devices comprising tension bars pivotally attached to said platform by one end of each bar, the other end constituting the pendulum pivot suspension for the cage, and means for leveling the platform when unequally loaded comprising a motor driven screw device effective to rock the platform on the pivots of said tension bars to level position, laterally displacing the platform and its load with respect to its upper point of suspension.

3. An elevator storage structure comprising a plurality of towers laterally spaced apart, means bridging the towers at the top to support an elevator, double belt elevators occupying space between the towers, horizontal ladder bars in spaced position, said bars attached to said belts, a plurality of cages pendulum suspended from said bars between said belts, said cages each adapted to store an automobile, and electric automatic means for leveling the cages when loaded that are controlled by a pendulum suspended on each cage.

4. An elevator storage structure comprising a plurality of towers laterally spaced apart, means bridging the towers at the top to support an elevator, double belt elevators occupying the space between the towers, horizontal ladder bars in spaced position, said bars attached to said belts, a plurality of cages pendulum suspended from said bars between the belts, said cages each adapted to store an automobile, each cage being suspended from a ladder bar by tension members attached thereto and pivotally connected to the cage near its bottom, with means for shifting said tension members to level the cage.

WILLIAM G. SMITH.

REFERENCES CITED

The following references are of record in the file of this patent:

UNITED STATES PATENTS

| Number | Name | Date |
| --- | --- | --- |
| 1,472,445 | Van Eseltine | Oct. 30, 1923 |
| 1,524,505 | Blue | Jan. 27, 1925 |
| 1,668,337 | Ross et al. | May 1, 1928 |
| 1,826,357 | Makutchan | Oct. 6, 1931 |
| 1,870,069 | Rugg | Aug. 2, 1932 |
| 1,944,100 | Medor | Jan. 16, 1934 |
| 2,020,306 | Fitch | Nov. 12, 1935 |
| 2,174,997 | Ronk | Oct. 3, 1939 |

FOREIGN PATENTS

| Number | Country | Date |
| --- | --- | --- |
| 17,728 | Sweden | June 11, 1904 |